(12) United States Patent
York

(10) Patent No.: US 7,156,054 B1
(45) Date of Patent: Jan. 2, 2007

(54) HORSE WALKER/ANIMAL CONDITIONING SYSTEM

(76) Inventor: Rick York, 1955-B Surgi Dr., Mandeville, LA (US) 70448

( * ) Notice: Subject to any disclaimer, the term of this patent is extended or adjusted under 35 U.S.C. 154(b) by 0 days.

(21) Appl. No.: 10/870,602

(22) Filed: Jun. 16, 2004

(51) Int. Cl.
*A01K 15/02* (2006.01)

(52) U.S. Cl. ............... 119/704; 119/701; 119/702; 119/703; 472/1

(58) Field of Classification Search ............ 119/704, 119/701, 702, 703, 712, 721; 472/27, 32, 472/33, 29, 1; D30/160
See application file for complete search history.

(56) References Cited

U.S. PATENT DOCUMENTS

| 3,421,132 | A |   | 1/1969  | Fischer et al. |           |
|-----------|---|---|---------|----------------|-----------|
| 3,705,720 | A | * | 12/1972 | Nicholls       | 472/9     |
| 3,716,029 | A | * | 2/1973  | Pillsbury, Jr. | 119/701   |
| 3,773,018 | A | * | 11/1973 | Profughi       | 119/701   |
| D229,570  | S |   | 12/1973 | Johnson        |           |
| 3,981,274 | A |   | 9/1976  | Curtis         |           |
| 4,275,686 | A |   | 6/1981  | MacGillivray   |           |
| 4,766,848 | A |   | 8/1988  | Rocco et al.   |           |
| 4,878,864 | A | * | 11/1989 | Van Bentem     | 440/5     |
| 5,103,770 | A | * | 4/1992  | Berkovich      | 119/708   |
| 5,531,246 | A | * | 7/1996  | Ritter         | 137/355.21|
| 5,630,380 | A |   | 5/1997  | Karanges       |           |
| 5,676,601 | A |   | 10/1997 | Saunders       |           |
| 6,055,939 | A | * | 5/2000  | Stelljes       | 119/712   |
| 6,213,056 | B1|   | 4/2001  | Bergmann et al.|           |

FOREIGN PATENT DOCUMENTS

| EP | 0404711   | * | 6/1990 |
|----|-----------|---|--------|
| GB | 2249012 A | * | 4/1992 |
| GB | 2332610 A | * | 6/1999 |

OTHER PUBLICATIONS

White Hydraulics DT Series disclosure on World Wide Web at http://whitehydraulics.com/dt.series.html (C) 2000, 3 pages.*
White Hydraulics DT Series disclosure on World Wide Web at http://whitehydraulics.com/dt.series.html (C) 2000. 3 pages.

* cited by examiner

*Primary Examiner*—Andrea M. Valenti
(74) *Attorney, Agent, or Firm*—Joseph T. Regard Ltd plc

(57) ABSTRACT

An animal walker or conditioning system. The preferred embodiment of the present invention contemplates a horse walker or conditioner incorporating a direct drive hydraulic motor, the motor configured to provide a powered bearing surface to support and axially rotate a vertical shaft having laterally extending arms emanating therefrom, which arms can be utilized to direct a horse or other animal in a circular path about the vertical shaft. The unique design utilizes an off the shelf direct drive hydraulic motor and conventional power system, with the hydraulic power unit preferably situated away from the vertical shaft, and power and control lines running underground to the hydraulic motor supporting the vertical shaft.

21 Claims, 3 Drawing Sheets

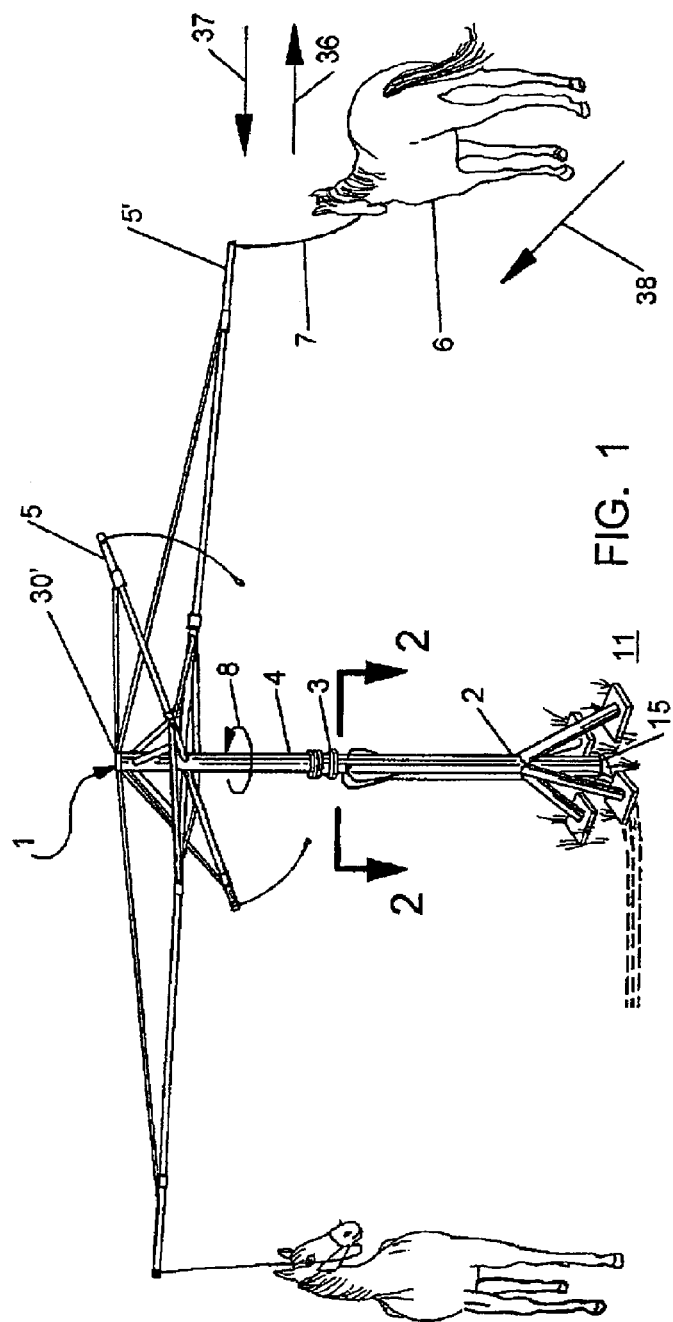
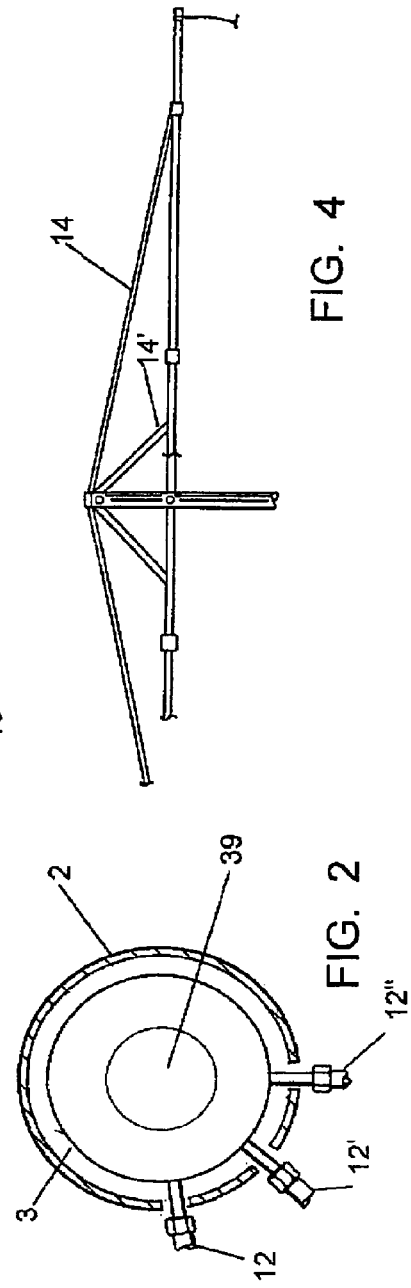
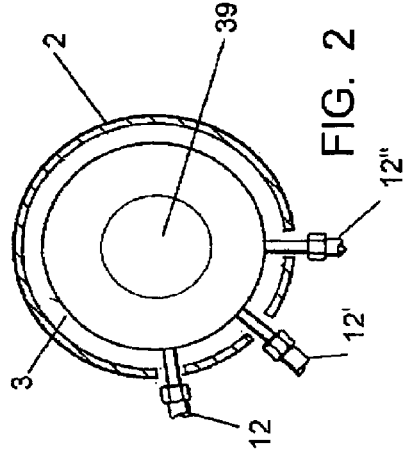

HORSE WALKER/ANIMAL CONDITIONING SYSTEM

TECHNICAL FIELD of the INVENTION

The present invention relates to animal exercise or conditioning devices, and in particular to an animal walker or conditioner incorporating a direct drive hydraulic motor configured to provide a powered bearing surface, while supporting an axially rotating a vertical shaft having laterally extending arms emanating therefrom, which arms are utilized to direct a horse or other animal in a circular path thereabout.

The preferred embodiment of the present invention teaches a horse walker which is uniquely designed to utilize an off the shelf, direct drive hydraulic motor and conventional power unit, with the power unit preferably situated away from the walker unit, with the power and control lines running underground to the hydraulic motor supporting the vertical shaft on the unit.

Unlike prior art systems, the present invention provides a horse walker wherein the location of the motor is not obvious to the casual observer, the present system providing a low noise, high efficiency, low maintenance, very effective horse walker or conditioning device. Further, the hydraulic system of the present invention provides pulling force to the animal in a more gradual fashion when compared to prior art systems, resulting in less trauma to the animal and better conditioning.

BACKGROUND OF THE INVENTION

Horse walkers or "roundabouts" have been utilized for years in the training and conditioning of horses and other animals, the typical unit often being crudely fabricated utilizing a vertically oriented, used, rear differential from a vehicle, to form a vertical support, transmission, and rotating shaft for a plurality of laterally emanating arms, each of which directs a horse in a circle about the vertical support.

Typically in such a unit the rear differential is powered via a drive belt, chain or the like engaging an electric motor. With such a design, when the horse resists the walker, it can cause the motor to burn out or trip a breaker, which causes the unit to cease functioning until it is reset. The belt requires maintenance, and belt slippage can cause loud noise which can distress the animals. Further this type of unit does not provide optimal pulling technique for training horses, the unit either applying to little pressure or pulling with too much force, depending upon its motor and gear and arrangement, which can result in injuring the horse, or ineffective training or conditioning. Further, because the unit relies upon electricity, and the unit is generally made of a conductive material (metal) in the elements, there exists, the possibility of electric shock.

U.S. Pat. No. 4,275,686 is illustrative of a device wherein an electric motor is provided at the top of the vertical support, which motor, via V-belt, caused a separate vertical shaft to rotate the spars.

U.S. Pat. Nos. 4,766,848, 5,630,380, Des 229,570, U.S. Pat. No. 3,424,132, and U.S. Pat. No. 6,213,056 teach horse walkers wherein the vertical support member comprises the drive shaft along its length, with the motor (illustrated as electric), via chain, belt, or friction drive, situated at the bottom of the vertical support member, which causes the vertical support shaft to spin about its axis.

U.S. Pat. No. 3,981,274 teaches horse walker wherein the vertical support member incorporates a vertical drive shaft about mid-way up the support, the upper portion rotated via exterior motor with a friction drive wheel.

U.S. Pat. No. 5,676,601 teaches a carousel apparatus or turntable having a vertical drive which is indicated as may be driven by a hydraulic motor.

All of the above horse walkers exclusively contemplate the utilization of electric drive means, and a belt, chain, or friction drive train or the like, each of which presents inherent problems mentioned in the above discussion.

GENERAL SUMMARY DISCUSSION OF THE INVENTION

Unlike the prior art, the present invention contemplates a hydraulic powered, direct drive animal walker/trainer/conditioning device which is easy to operate and maintain, quite, and effective in operation.

The present invention utilizes a direct drive incorporating a hydraulic motor incorporated into the vertical support, so as to provide a powered bearing surface, while supporting the rotating vertical shaft thereabove which in turn has emanating therefrom a plurality of laterally extending arms or spars, upon which each may have engaged thereto a horse or other animal, which is directed in a circular path thereabout for training or conditioning purposes.

The hydraulic motor is discreetly powered via a conventional power unit, with the power unit preferably situated away from the walker unit, with the power and control lines running underground to the hydraulic motor supporting the vertical shaft on the unit.

Unlike prior systems, which provided too much or too little pulling force, the hydraulic system of the present invention pulls the animal in a more gradual fashion, and can be set to start out with a light pull which increases upon resistance, so as to avoid injuring the animal and provide a more gentle training/conditioning/exercise session.

It is therefore an object of the present invention to provide a walkabout-type animal conditioning system utilizing a direct drive hydraulic power means.

It is another object of the present invention to provide an animal walker/conditioner/trainer which is quiet in operation, gentle in use, and low in maintenance.

It is another object of the present invention to provide a horse walker wherein the motor is an integral part of the structure of the vertical support for the arms.

It is still another object of the present invention to provide a horse walker which utilizes a direct drive which is not readily discernable to the casual observer.

It is still another object of the present invention to provide a horse walker which can be configured to provide a gradual pull to the animal, which increases upon resistance.

It is still another object of the present invention to provide a horse walker which is remotely powered and controlled.

It is another object of the present invention to provide a hydraulic animal walker/trainer/conditioning system which does not pose an electrocution hazard.

Lastly, it is an object of the present invention to provide an animal walker/trainer/conditioning system which does not require or rely upon belts, chains, or the like, which can be noisy, inconsistent in operation, and require frequent maintenance.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein:

FIG. 1 is a side, perspective view of the preferred embodiment of the system of the present invention.

FIG. 2 is a top, cut-away view of the vertical support of the invention of FIG. 1, illustrating the hydraulic control, power and return lines emanating therefrom.

FIG. 4 is a side, partial view of the invention of FIG. 1, illustrating the construction of the arms or spars.

DETAILED DISCUSSION OF THE INVENTION

Figure 3:
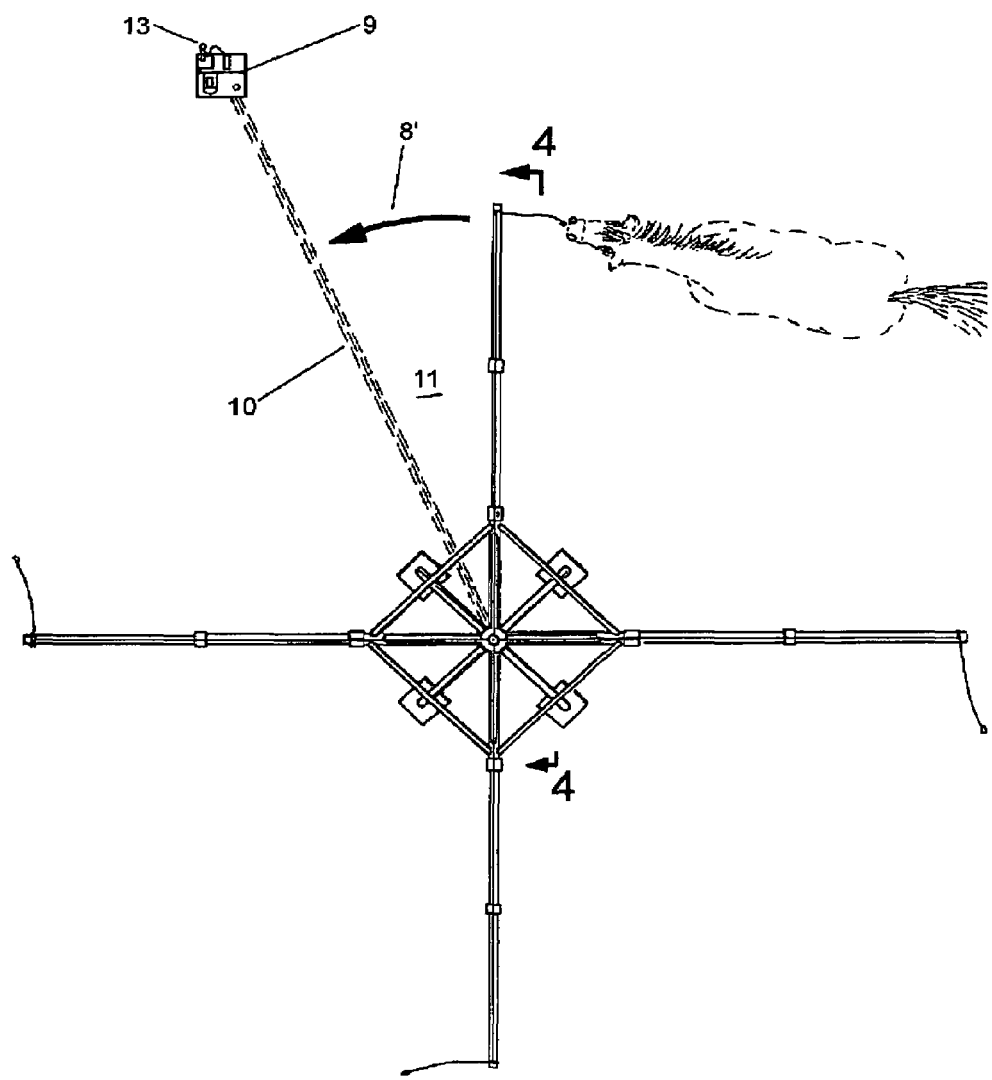
FIG. 3 is a top view of the invention of FIG. 1, further illustrating the power unit situated away from the walker.

Referring to FIGS. 1–4 of the drawings, the horse walker 1 of the present invention comprises a base 2 having a motor 3 mounted thereupon, which motor rotates 8 a vertical shaft 4, the vertical shaft having laterally emanating therefrom a plurality of spars 5, 5' or arms, each arm having mounted to its distal end 5' a tether 7 or the like which engages the animal such as a horse 6 or the like.

The motor 3 utilized in the prototype of the preferred embodiment of the invention is a direct drive hydraulic orbital valve motor in a compact housing manufactured by White Hydraulics of Hopkinsville, Ky. 42240 under the ROLLER STATOR brand, DT Series, which is configured to provide enhanced torque potential in a small footprint. It is likewise noted that other hydraulic motors would likewise be suitable, and the indication of the preferred motor is intended to be illustrative and not limiting.

The motor 3 is driven by a conventional power unit 9 or "power pack" which provides the hydraulic fluid to power and control the motor via hydraulic lines 10 comprising power 12, 12" lines and a control 12's line engaging the motor and accessible through the base via apertures 120, 120' formed there through or the like. Hydraulic motor controls 13 in the form of valves or the like are provided to control power, speed, and/or direction of rotation, and may be located, along with the power unit, situated away from the horse walker 1 via the hydraulic lines 10, which may be run under the ground 11 if desired. The power unit may be driven by electrical power utilizing an electric motor and hydraulic pump, or alternatively by an internal combustion engine to drive the hydraulic pump.

The shaft 4 has lower 30 and upper 30' ends, the upper end supporting of spars or arms 5, 5', which laterally emanate therefrom in equidistant fashion and may be reinforced by supports 14, 14'.

Figures 5, 6:
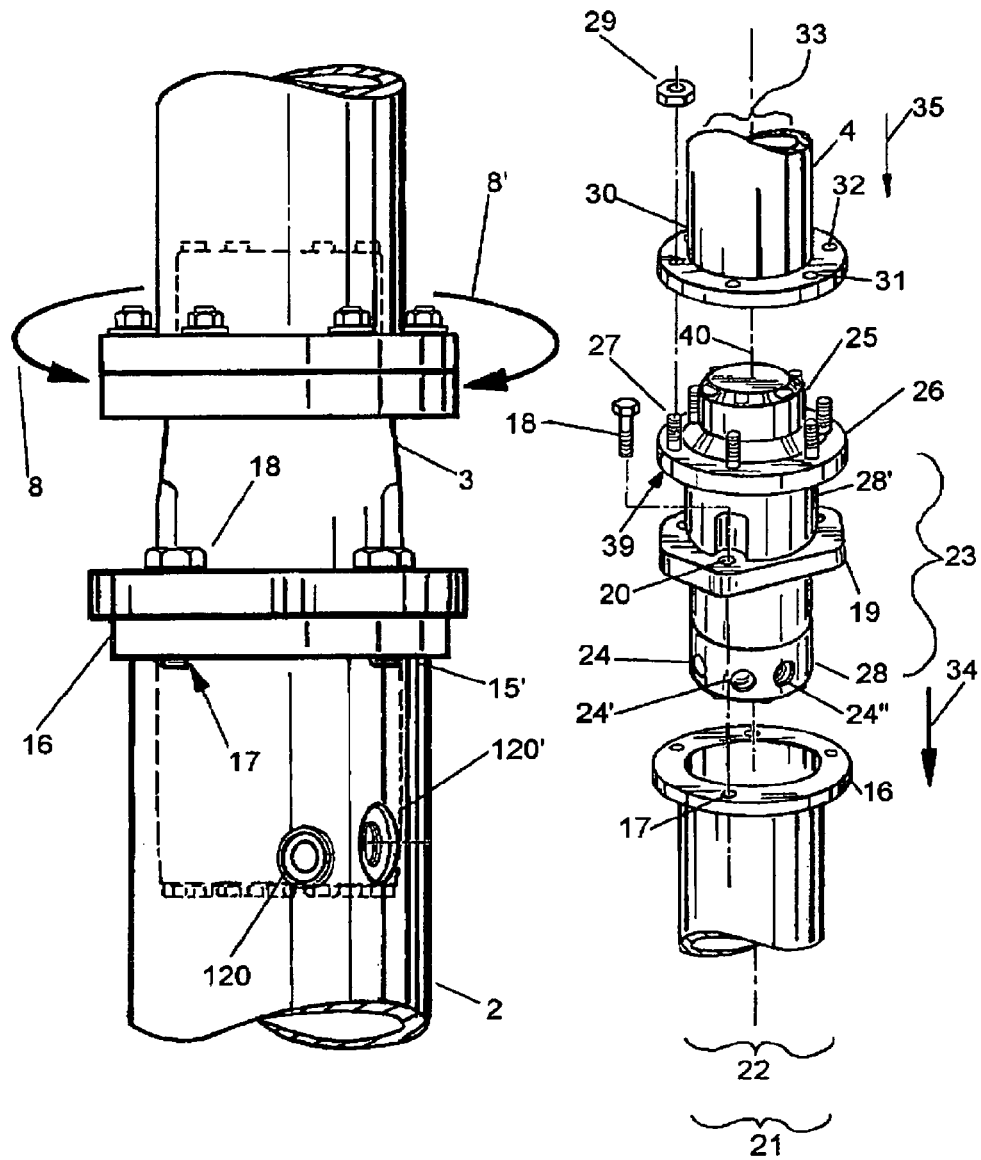
FIG. 5 is a side view of the direct drive motor of the present invention (partially in phantom, as mounted to the lower vertical support and upper rotating vertical shaft.
FIG. 6 is a side, exploded view of the direct drive motor of FIG. 5 as mounted to the lower vertical support and upper rotating vertical shaft.

Continuing with FIGS. 1, 2, 5 and 6, the base comprises a pipe or the like having an inner diameter 22, a lower end 15 engaging the ground, and an upper end 15' having a mounting flange 16 having mounting apertures 17 formed therein. The motor 3 comprises a motor body 23 having lower 28 and upper 28' ends, and side power 24, 24" and control 24' ports, a lower mounting flange 19 (having mounting apertures 20), and an outer diameter 21.

A lower portion of the motor body 23 is configured to be placed 34 into and be enveloped by the inner diameter 22 of the upper end 15' of the base so that the lower mounting flange 19 of the motor body engages the mounting flange 16 of the base, the mounting apertures 20, 17 aligned, and the flanges secured via bolts 18 or the like.

Emanating of the upper end 28' of the motor body is a motor shaft 39 having a spindle 25 mounted thereon, the spindle 25 having a flange, designated the upper mounting flange 26, having mounting bolts 27 situated thereon configured to engage shaft mounting flange 31 at the lower 30 end of the vertically situated shaft 4 via bolt apertures 32 and secured bolts 29, with the spindle 25 portion situated within and enveloped 35 by the inner diameter 33 of the lower portion 30 of the shaft 4, so that the motor shaft 39, vertical shaft 4, and base 2 are aligned along or have a common longitudinal axis 40. Further, said motor shaft and vertical shaft thereby rotate about a common longitudinal axis, and said motor bears the weight and load of said vertical shaft and arms or spars.

In use, an animal such as a horse 6 is hitched via tether 7 to the one of the spars or arms 5', the power unit 9 engaged, the controls 13 adjusted to power the motor 3 counter clockwise 8 or clockwise 8'. The hydraulic motor is very quite and the power unit located away from the walker likewise results in a quite training, exercise or conditioning atmosphere for the animal. The nature of the hydraulic motor is such that resistance 36 by the animal results in a gradual build-up of pressure in the motor unit due to the pumping of the hydraulic pump, which results in gradual counter force 37 applied by the unit up to a specified pressure which either overcomes the animals resistance or is maintained at is peak, which will tend to cause the animal to become tired or uncomfortable resisting, at which point the animal will tend to capitulate and be guided 38 by the arm 5' and walk, trot or run depending upon the speed.

| Element | Recitation of the Elements Description |
|---|---|
| 1 | horse walker |
| 2 | base |
| 3 | motor |
| 4 | vertical shaft |
| 5,' | spars or arms |
| 6 | horse |
| 7 | tether |
| 8,' | rotates |
| 9 | power unit |
| 10 | lines |
| 11 | ground |
| 12,',″ | power line, control line, 2nd power line |
| 13 | controls |
| 14,' | supports |
| 15,' | first, second ends of base |
| 16 | mounting flange on base |
| 17 | mounting apertures |
| 18 | bolt |
| 19 | lower mounting flange on motor |
| 20 | mounting aperture |
| 21 | motor diameter |
| 22 | ID of base |
| 23 | motor body |
| 24,',″ | control line, power line, return line ports |
| 25 | spindle (mounted on shaft) |
| 26 | upper mounting flange |
| 27 | mounting bolts |
| 28,' | lower, upper ends |
| 29 | nut |
| 30 | shaft lower, upper ends |
| 31 | shaft mounting flange |
| 32 | bolt apertures |
| 33 | Cavity having ID |
| 34 | Placed into |
| 35 | enveloped by |

-continued

Recitation of the Elements

| Element | Description |
|---|---|
| 36 | resistance |
| 37 | guided |
| 38 | |
| 39 | motor shaft |
| 40 | longitudinal axis |
| 120,' | apertures |

Specification of Exemplary Embodiment

Base: five inch diameter steel pipe, five foot long, anchored in the ground; lower support legs situated at about forty-five degrees stabilize the base.

Vertical Shaft: five inch diameter steel pipe, four foot long.

Spars: two inch diameter steel pipe having a length of fifteen feet, and supported by upper stabilizing supports engaged to the upper portion of the shaft.

Power Unit: Hydraulic Industries brand, custom configured power unit having 1.5 horsepower electric motor, 4.8 gallon fluid reservoir, and 1.5 gallon per minute (GPM) hydraulic pump.

Exemplary Operating Characteristics of Prototype

With the power unit developing an operating pressure with no load rotates at an exemplary speed of 0–6 mph.

The exemplary unit has a pressure overload valve which is variable, but for the present application is set to apply 125 pounds of force to the animal at the arm maximum with resistance.

While the motor of the exemplary embodiment of the present invention is hydraulic, the present invention may be utilized with electric, pneumatic, or other power means, and the utilization of a hydraulic motor is not intended to be limiting.

While the device is referenced as being useful for exercising animals, the term "exercise" as used is not intended to be limited to a specific type of application, but rather illustrative of one of many preferred uses. The system is likewise ideally suited and employed in the manner recited above to condition and/or train various animals as well in a variety of applications, including domesticating horses for riding or other activities.

It is iterated that the use of the term "horse walker" is to disclose the preferred embodiment of the invention, and is not intended to be limiting. The present system is ideally suited for a variety of animals including dogs and others, and is not intended to specified as being limited to horses.

The invention embodiments herein described are done so in detail for exemplary purposes only, and may be subject to many different variations in measurements, materials, powering device including motor and power unit, and other aspects of the design, structure, application and operation methodology. Thus, the detailed disclosures therein should be interpreted in an illustrative, exemplary manner, and not in a limited sense.

What is claimed is:

1. An animal conditioning apparatus, comprising:
a motor having a motor shaft having a longitudinal axis;
a vertical shaft having first and second ends, said first end of said vertical shaft engaging said motor shaft, said second end of said vertical shaft having emanating therefrom an arm formed to engage an animal;
an elongated base having first and second ends and a longitudinal axis, said first end of said base engaging a ground surface, said motor substantially positioned in said second end of said elongated base in spaced relationship above said ground surface, said elongated base, said motor shaft and said vertical shaft being in vertical alignment along a common longitudinal axis, and said elongated base, said motor, and said vertical shaft being engaged, respectively, so as to form an elongated vertical support having a generally uniform width;
said motor being formed so as to supports and rotates said vertical shaft and said arm so as to urge an animal engaged to said arm in a circular path about said vertical shaft; a fluid power source for powering said motor; a fluid line engaging said motor via said elongated base, said fluid line engaging said fluid power source such that fluid from said fluid power source is directed to said motor; wherein said fluid power source is situated outside of said circular path of rotation.

2. The apparatus of claim 1, wherein said motor is hydraulic.

3. The apparatus of claim 2, wherein said motor is direct drive.

4. The apparatus of claim 1, wherein said fluid comprises hydraulic fluid, said fluid power source comprises a hydraulic pump, and said fluid powered motor comprises a hydraulic motor.

5. The apparatus of claim 4, wherein said elongated base further comprises a base mounting flange, whereby said motor comprises a body having first and second ends and a lower mounting flange, and whereby said lower mounting flange engages said base mounting flange.

6. The apparatus of claim 5, wherein said elongated base has an inner diameter, and whereby first end of said body of said motor is enveloped by said base when said motor is engaged to said base.

7. The apparatus of claim 6, wherein said motor shaft has a spindle having an upper mounting flange thereon, wherein said first end of said vertical shaft has a shaft mounting flange, and wherein said upper mounting flange of said spindle engages said shaft mounting flange.

8. The apparatus of claim 7, wherein said vertical shaft has an inner diameter, and wherein said spindle is enveloped by said inner diameter of said vertical shaft.

9. A method of conditioning an animal, comprising the steps of:
a. providing an animal conditioning apparatus, comprising:
I. a motor having a body having first and second ends, and a motor shaft emanating from said first end of said body;
ii. a first vertical shaft having first and second ends, said second end of said first vertical shaft having an arm having a length, said arm emanating therefrom formed to engage an animal, said first end of said vertical shaft engaged to said motor shaft;
iii. a second vertical shaft having first and second ends, said second end of said second vertical shaft forming a receiver for receiving said second end of said motor body, said first end of said second vertical shaft engaging a ground surface;
said second vertical shaft said motor, and said first vertical shaft being engaged, respectively, so as to form an elongated vertical support having a generally uniform width, said elongated vertical support formed to rotatingly support said arm above the ground, so as to form a circular path about said elongated vertical support; a fluid power source for powering said motor;

wherein said fluid power source is situated outside of said circular path; and a fluid line engaging said motor via said second vertical shaft, said fluid line also engaging said fluid power source such that fluid from said fluid power source is directed to said motor;

b. engaging an animal to said arm;

c. powering said motor at a predetermined level, comprising the sub-steps of, I.) rotating said first vertical shaft and said motor shaft about a common longitudinal axis aligned with said second vertical shaft, while, II.) utilizing said motor to support said first vertical shaft in longitudinal alignment with said second vertical shaft, said first vertical shaft further supporting said arm; and d. utilizing said arm to urge said animal to move;

e. upon meeting resistance from said animal, gradually increasing the power on said motor over time by utilizing said fluid power source to increase pressure fluid to said motor to a maximum force level until said animal moves in a circular path about said rotating first vertical shaft;

f. after the animal has begun moving, decreasing the power on said motor by utilizing said fluid power source to decrease pressure of fluid from said fluid power source to said motor to a predetermined level.

10. An animal conditioning apparatus, comprising:

a motor having a body having first and second ends, a width, and a motor shaft emanating from said first end of said body;

a vertical shaft having first and second ends, said vertical shaft having an arm emanating therefrom to engage an animal and guide the animal in a circular path, said vertical shaft and said arm having a weight, said first end of said vertical shaft engaged to said motor shaft;

a base having first and second ends situated along a longitudinal axis, said first end engaging a ground surface;

said motor substantially positioned in said second end of said base such that said base and said motor shaft are aligned along a common longitudinal axis:

said base, said motor, and said vertical shaft forming an elongated vertical structure having a generally uniform width of about said width of said motor;

said vertical shaft and said motor shaft engaged so as to rotate about a common longitudinal axis, while said motor shaft supports and bears the weight of said vertical shaft and said arm; a fluid power source for powering said motor, wherein said fluid power source is situated outside of said circular path; and a fluid line engaging said motor via said base, said fluid line further engaging said fluid power source, such that fluid from said fluid power source is directed to said fluid power motor.

11. The apparatus of claim 10, wherein said motor is hydraulic.

12. The apparatus of claim 11, wherein said motor is direct drive.

13. The animal conditioner of claim 10, wherein said fluid powered motor comprises a hydraulic motor.

14. The apparatus of claim 13, wherein said base further comprises a base mounting flange, whereby said motor comprises a lower mounting flange, and whereby said lower mounting flange engages said base mounting flange.

15. The apparatus of claim 14, wherein said base has an inner diameter, and whereby first end of said body of said motor is at least partially enveloped by said base when said motor is engaged to said base.

16. The apparatus of claim 15, wherein said motor shaft has a spindle having an upper mounting flange thereon, wherein said first end of said vertical shaft has a shaft mounting flange, and wherein said upper mounting flange of said spindle engages said shaft mounting flange.

17. The apparatus of claim 16, wherein said vertical shaft has an inner diameter, and wherein said spindle is enveloped by said inner diameter of said vertical shaft.

18. The method of conditioning an animal, comprising the steps of:

a. providing an animal conditioning apparatus, comprising:

i. a motor having a body having first and second ends, a motor shaft emanating from said first end of said body;

ii. a first vertical shaft having first and second ends, said second end of said first vertical shaft having an arm having a length, said arm emanating therefrom formed to engage an animal, said first end of said vertical shaft engaged to said motor shaft;

iii. a second vertical shaft having first and second ends, said second end of said second vertical shaft forming a receiver for receiving said first end of said motor body said first end of said second vertical shaft engaging a ground surface;

said second vertical shaft, said fluid powered motor, and said first vertical shaft being longitudinally engaged, respectively, so as to form an elongated vertical support having a generally uniform width, said enlongated vertical support formed to rotatingly support said arm above the ground, so as to form a circular path about said vertical elongated support; a fluid power source situated outside of said circular path; and a fluid line engaging said fluid powered motor via said second vertical shaft; said fluid line also engaging said fluid power source;

b. engaging an animal to said arm;

c. powering said motor by initiating a flow of fluid from said fluid power source to said fluid powered motor, rotating said first vertical shaft and said motor shaft about a common longitudinal axis aligned with said second vertical shaft, while utilizing said motor to support said first vertical shaft in longitudinal alignment with said second vertical shaft, said first vertical shaft further supporting said arm; and d. utilizing said arm to direct said animal about said rotating vertical shaft.

19. An animal conditioner, comprising:

a motor having a body having first and second ends and a width, and a motor shaft emanating from said first end of said body;

a first vertical shaft having first and second ends, said second end of said first vertical shaft having an arm having a length, said arm emanating therefrom formed to engage an animal, said first end of said first vertical shaft engaged to said motor shaft;

a second vertical shaft having first and second ends, said second end of said second vertical shaft forming a receiver for receiving said second end of said motor body, said first end of said second vertical shaft engaging a ground surface;

said second vertical shaft, said motor, and said first vertical shaft being longitudinally engaged, respectively, so as to form an elongated vertical support having a generally uniform width of about said width of said motor, said vertical support rotatingly supporting said arm above the ground, so as to form a circular path of rotation; a fluid power source for powering said motor, said fluid power source situated outside of said circular path of rotation; and a fluid line engaging said motor via said second vertical shaft, said fluid line also engaging said fluid power source, such that fluid from said fluid power source is directed to said motor.

20. The animal conditioner of claim 19, wherein said fluid powered motor comprises a hydraulic motor.

21. The animal conditioner of claim 19, wherein said fluid powered motor comprises a pneumatic motor.

* * * * *